Aug. 3, 1937.  J. J. HENNESSY  2,088,700
LUBRICANT RETAINING MEANS FOR JOURNALS
Filed June 4, 1934
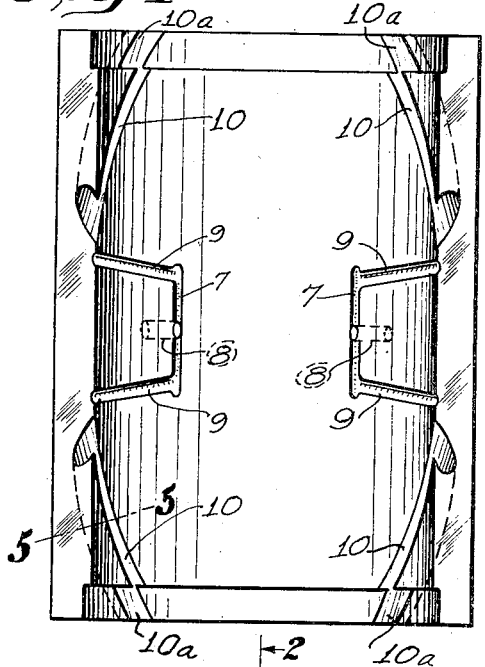
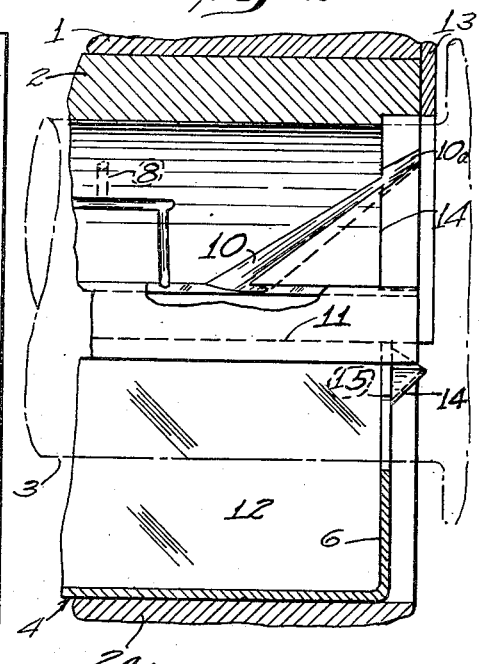
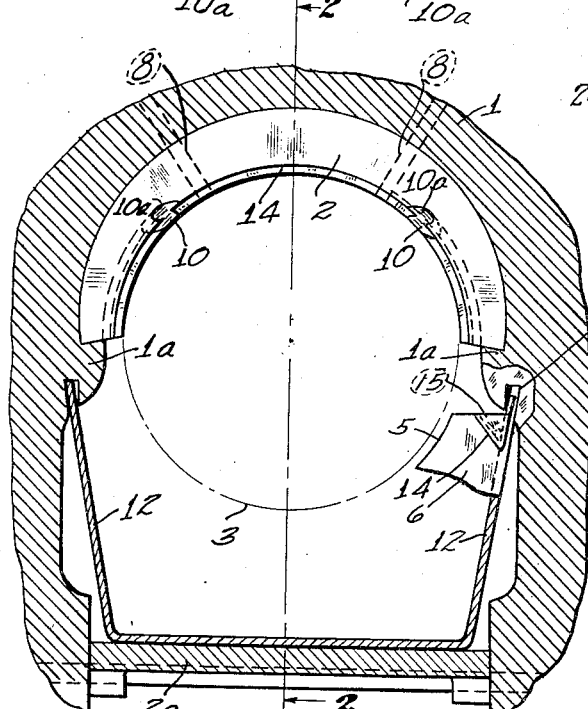
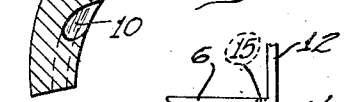
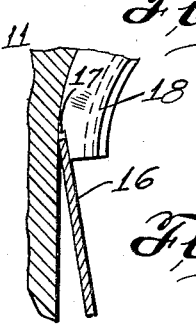
INVENTOR
James J. Hennessy
By Rodney Bedell
ATTORNEY Patented Aug. 3, 1937

2,088,700

UNITED STATES PATENT OFFICE 2,088,700

LUBRICANT RETAINING MEANS FOR JOURNALS

James J. Hennessy, New York, N. Y.

Application June 4, 1934, Serial No. 728,894

11 Claims. (Cl. 308—80)

This invention relates to means for recovering excess lubricant supplied to vehicle journals and particularly the journals of railway vehicles.

Effective oil lubrication of railway vehicle journals, which carry heavy loads, requires that substantial quantities of lubricant be supplied to the journal and bearing continuously during operation of the vehicle. Where a constant flow of lubricant to the bearing is maintained in sufficient quantities to insure adequate lubrication under all conditions, much of the oil escapes endwise of the journal and is thrown off centrifugally outside the journal box and lost. Various devices heretofore devised for recapturing the excess lubricant have not eliminated this oil waste.

The equipment of railway vehicle journal boxes with effective oil recapturing means is necessary to justify economically the application to the journal of substantial quantities of oil and the main object of the present invention is to recapture surplus oil more effectually than has been done heretofore.

The idea has been suggested previously of providing shallow grooves in the undersurface of the crown bearing, which grooves extend inwardly and downwardly from the ends of the bearing for the purpose of collecting excess oil on the surface of the journal and conducting the same downwardly to the side edges of the bearing whence it may drip into an oil cellar or reservoir beneath. However, lubricant accumulated in such grooves rests on the journal and it has been found that since the oil in the grooves remains in contact with the journal throughout its travel along the grooves, a substantial part of the oil is entrained by the journal and drawn from the grooves and discharged much as if the grooves were not present and is forced out at the end of the bearing instead of following the grooves and discharging at the sides of the bearing into the reservoir as intended.

In the present invention the undersurface of the crown bearing is provided with undercut inclined grooves which are substantially trough shaped in cross section whereby lubricant accumulated therein may flow inwardly and downwardly to the side edges of the bearing uninfluenced by the movement of the journal. In one form of the invention the side walls of the journal box beneath the crown bearing are grooved and the upstanding walls of the cellar are inserted in these grooves. In another form the lower edges of the bearing itself are recessed for receiving the upstanding walls of the cellar. The slotted side walls of the driving box and the recessed lower edges of the bearing are also illustrated and described in co-pending application Serial No. 558,719, filed August 22, 1931, Patent No. 1,961,664, in the name of the present inventor.

In the accompanying drawing illustrating the invention—

Figure 1 is a bottom view of a railway vehicle crown bearing embodying a feature of the invention.

Figure 2 is a vertical longitudinal section taken on the line 2—2 of Figure 3.

Figure 3 is an end view of the structure in Figure 2, the box and cellar being shown in vertical transverse section.

Figure 4 is a top view of a portion of the lubricant cellar illustrating a detail.

Figure 5 is a detail section taken on the line 5—5 of Figure 1.

Figure 6 is a detail section illustrating a modification of the structure shown in Figure 3.

A locomotive driving box 1 is fitted with the bearing brass 2 seated on the box wall projections 1a and engaging the journal 3. The lubricant cellar 4 is supported beneath the journal on the spacer 2a and with its end walls, one of which is shown at 6, semicircularly recessed as at 5 for clearing the journal. Any suitable means may be provided for supplying lubricant to the journal. In the present instance the undersurface of the bearing is shown provided with shallow longitudinal slots 7, communicating with passages 8 leading through the top of the bearing, and also with transverse grooves 9 leading downwardly to the side edges of the bearing. Oil is supplied to the journal direct by means of a pump (not shown) located in the cellar, or by gravity through a supply conduit (not shown) connecting the passage 8 with a reservoir. The lubricating grooves 7, 9 and passages 8 may have any suitable form and disposition, the grooves shown being merely illustrative.

The journal engaging face of the bearing is also provided with undercut or pocketed grooves 10 extending from the ends of the bearing longitudinally and downwardly to intersect the side edges of the bearing at points spaced from the ends thereof. These grooves are substantially trough-shaped in transverse section, as best shown in Figure 5. Due to the shape of grooves 10, oil on the downwardly moving face of the journal will be scraped or wiped from the journal more effectively than it would be by the ordinary square-cut groove. The groove forms a pocket having a bottom at a lower level than the portion of the journal abreast of the groove. The excess oil, whether wiped from the upwardly or the downwardly moving face of the journal, will be supported in the pocket and not on the journal and will flow by gravity down the groove pocket free of the influence of the moving journal.

To prevent the lubricant flowing from the grooves 10 and the sides of the bearing to the outside of the cellar, the side walls of the box are provided with longitudinal grooves 11 and the upstanding side walls 12 of the cellar extend thereinto. As indicated in Figure 2, the cellar end wall 6 is located inwardly of the outer end of the driving box to which is secured the hub liner 13 and the corresponding end of the bearing 2 is undercut as at 14 to bring the end of the journal engaging face thereof inside the cellar end wall 6. Lubricant squeezed longitudinally from beneath the bearing will form in a ring just beyond the end of the bearing and, due to the lateral play of the journal within the box, will extend substantially helically around the journal. Some of the oil in this ring is recovered by the portions 10a of the undercut grooves. For collecting the lubricant which escapes from the undercut grooves and drips down the box side walls outside the cellar end wall 6, cup-like extensions 14 are secured to the end of the cellar and drain through small holes 15 in the cellar end wall. Each extension is formed of a small angle of sheet metal tapering to a point at its outer end and having one wall 14a substantially in alinement with the cellar side wall 12 and the groove 11. The extension 14 is welded to the cellar end wall at W.

In Figure 6, the upstanding side wall 16 of the cellar extends into a recess 17 in the side edge of bearing 18. In this form, as in the previous form, lubricant flowing from the sides of the bearing along the box wall is directed into the lubricant cellar.

The lubricant cellar illustrated serves merely for collecting the excess oil wiped or thrown off from the journal and may be provided with suitable lubricant distributing means such as waste or felt pads, or may receive a mechanical lubricator as shown in the Patent No. 1,961,664, referred to above, which may function to maintain a pool of oil constantly in engagement with the journal, thus providing so-called bath lubrication.

With the use of the features described above, oil may be supplied freely and continuously to the journal and bearing without fear of excessive losses, the novel grooves in the undersurface of the bearing cooperating with the overlapping cellar walls and recessed box walls or bearing and with the cup-like extensions on the ends of the cellar to recover substantial excesses of lubricant which otherwise would be thrown off or escape outside the cellar and be lost. Where the journal box is equipped with the novel cooperating features referred to, simple and inexpensive means may be provided for supplying lubricant to the journal and bearing in quantities in excess of minimum requirements since the surplus will not be wasted.

The invention is adapted for application to any type of railway vehicle journal and various details thereof may be modified as is necessary to conform with different requirements. The exclusive use of all such modifications as come within the scope of the appended claims is contemplated.

I claim:
1. A vehicle journal crown bearing constructed and arranged to rest directly upon a journal and having an undercut oil collecting groove with its edges formed by journal engaging metal, said groove extending longitudinally of the bearing and being inclined downwardly to the horizontal.

2. A vehicle journal bearing having an undercut oil collecting groove with its edges formed by journal engaging metal, said groove extending longitudinally of the bearing and being inclined downwardly to the horizontal and inwardly from each end of the bearing, the bottom of the groove being lower than the adjacent edges of the groove.

3. A railway vehicle journal bearing provided with an oil collecting groove with its edges formed by journal engaging metal, the lower side of which groove forms an acute angle with the adjacent journal engaging surface.

4. A railway vehicle journal bearing having a groove in a journal engaging portion of its face extending longitudinally of the bearing and inclined downwardly towards an end thereof, a transverse cross section through said groove presenting an upwardly and laterally opening trough section and having an edge above its lowest level disposed to contact with the journal to which the bearing is applied whereby excess lubricant may be scraped from the journal and may be drained away from the face of the bearing and along the latter free of contact with the journal and the resulting tendency to force the lubricant beneath said edge.

5. A vehicle journal bearing having an undercut groove extending longitudinally and downwardly along a portion of its face disposed to constantly engage the associated journal for recovering excess lubricant on the journal and having a lubricant supply passage opening into a portion of said face spaced from said groove.

6. A vehicle journal bearing having a plurality of undercut grooves in journal engaging portions of its face and extending inwardly and downwardly from the opposite ends to the opposite sides thereof, intermediate said ends, for recapturing excess lubricant on the journal.

7. In combination, a vehicle journal crown bearing having a recess in a side edge thereof, and a lubricant cellar beneath said bearing and with an upstanding side wall extending into said recess whereby lubricant flowing from said bearing is directed into said cellar.

8. In combination, a vehicle journal box having a recess in a downwardly facing portion of a side wall thereof, a journal crown bearing in said box, a lubricant cellar beneath said bearing and having an upstanding wall extending into said recess, said recess extending beyond said cellar, and a cup-like extension on said cellar substantially in line with said recess and communicating with said cellar for collecting lubricant flowing down said box wall beyond the normal limits of said cellar.

9. In combination, a vehicle journal box having a recess in the inner surface of a side wall thereof, a journal crown bearing in said box having an undercut groove extending longitudinally thereof, a lubricant cellar beneath said bearing with an upstanding wall extending into said recess and cooperating with said bearing groove to recapture excess lubricant on said journal between the limits of said cellar, and a cup-like extension on said cellar and substantially in line with said groove for recovering lubricant flowing down said box wall outside said cellar.

10. In combination, a vehicle journal housing including a lubricant cellar having an upstanding wall, and a journal crown bearing with a lateral edge overlapping the inside of said cellar wall to prevent oil dripping from said bearing from escaping over said cellar wall.

11. A railway vehicle journal housing structure including a lubricating crown bearing, a side part having an elongated recess, a lubricant cellar having a wall extending into said recess, and a cup-like extension at an end of said cellar wall for catching lubricant dripping from said bearing and recess beyond said cellar wall.

JAMES J. HENNESSY.